United States Patent
D'Ascenzo et al.

(10) Patent No.: US 7,035,381 B2
(45) Date of Patent: Apr. 25, 2006

(54) IDENTIFICATION TO A PUBLIC SAFETY ANSWERING POINT OF THE LOCATION OF AN EMERGENCY CALLER SERVED BY A PBX

(75) Inventors: Christopher J. D'Ascenzo, Green Lane, PA (US); Gregory T. Fox, Hatfield, PA (US); Mark Blattner, Phoenixville, PA (US); John Surry, Drexel Hill, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/772,758

(22) Filed: Feb. 5, 2004

(65) Prior Publication Data

US 2005/0175157 A1   Aug. 11, 2005

(51) Int. Cl.
*H04M 11/00* (2006.01)
(52) U.S. Cl. ............................ 379/45; 379/37
(58) Field of Classification Search .......... 379/45, 379/37–44, 90.01
See application file for complete search history.

(56) References Cited

U.S. PATENT DOCUMENTS

| | | | | |
|---|---|---|---|---|
| 5,161,180 A | * | 11/1992 | Chavous .................... | 379/45 |
| 5,235,630 A | * | 8/1993 | Moody et al. .............. | 379/37 |
| 6,266,397 B1 | * | 7/2001 | Stoner ....................... | 379/45 |
| 6,289,083 B1 | * | 9/2001 | Ray ........................... | 379/49 |
| 6,363,138 B1 | * | 3/2002 | Aprile ........................ | 379/45 |
| 6,868,139 B1 | * | 3/2005 | Stumer et al. ............. | 379/45 |

* cited by examiner

*Primary Examiner*—Stella Woo
(74) *Attorney, Agent, or Firm*—Duane Morris LLP

(57) ABSTRACT

A method provides to the attendant at a public safety answering point information relating to the location of a telephone which is the source of a call to an emergency number in one or more campuses served by one or more private business exchanges (PBXs). The PBX(s) produce information relating to the source and destination numbers of each call. The destination number is applied to a database to identify emergency calls, and the source number is applied to a second database to identify its location.

13 Claims, 5 Drawing Sheets

| DESTINATION PHONE # | STATUS |
|---|---|
| 1-0001 | NONEMERGENCY |
| ⋮ | ⋮ |
| 1-1234 | ALIEN ATTACK |
| 1-1235 | FIRE |
| 1-1236 | MEDICAL |
| 1-1237 | NONEMERGENCY |
| ⋮ | ⋮ |

| SOURCE PHONE # | STATUS |
|---|---|
| 1-0001 | A BLDG 1 |
| 1-0002 | B BLDG 1 |
| 1-0003 | C BLDG 2 |
| 1-0004 | D BLDG 2 |
| ⋮ | ⋮ |
| 2-0001 | N BLDG 201 |
| ⋮ | ⋮ |

| DESTINATION PHONE # | STATUS |
|---|---|
| 2-0001 | NONEMERGENCY |
| 2-2002 | NONEMERGENCY |
| ⋮ | ⋮ |
| 1-1235 | FIRE |
| 1-1236 | MEDICAL |
| 1-0001 | NONEMERGENCY |

IDENTIFICATION TO A PUBLIC SAFETY ANSWERING POINT OF THE LOCATION OF AN EMERGENCY CALLER SERVED BY A PBX

FIELD OF THE INVENTION

This invention relates to a method for the identification to a public safety answering point of the location of the source of a telephone call from within a campus or building complex, where the public safety answering point is associated with one or more private business exchanges serving the complex.

BACKGROUND OF THE INVENTION

When a person dials the emergency telephone number "911" it is often in order to report an emergency associated with the person making the call. Ordinarily, such telephone calls are routed to a local municipality 911 dispatcher. This dispatcher has important responsibilities, and it is desirable to give that person as much information as possible in order to allow a reasoned judgment. Among the pieces of information that may be useful to a 911 dispatcher is the location of the telephone from which the call originates. Local 911 dispatch centers which handle emergency calls relay on Automatic Number Generation (ANI) (commonly referred to as "caller identification" or "caller ID) and Automatic Location Information (ALI) data, both generated by the telephone company, to locate the source (address, apartment number, cell phone, etc.) of the emergency call. The ANI and ALI information is used by the local 911 dispatch center to identify those emergency response resources available near the location of the originator of the emergency call, and to route the appropriate resources to the scene.

The location of the origin of a call to a 911 dispatch center is often difficult, as in those cases in which the telephone connection goes dead during the call, the caller has difficulty in assessing his location, or in reporting the location. Deaf andor dumb callers may present especial difficulties.

Many large businesses establish their operations in large office buildings or in groups of office buildings or building complexes (campus). Such campuses may have dozens or hundreds of telephone extensions which communicate with the outside world (the plain old telephone service or POTS) by means of one or more private business exchanges (PBX).

When an emergency number such as "911" is dialed by an extension within the campus and the call is routed by a PBX to POTS, the only ANI information made available to the 911 dispatcher or other emergency worker is a general telephone number for the campus, and not for the individual source extension within the campus. Similarly, the only ALI information is the formal address of the campus. The general telephone number of the campus and its formal address will often be insufficient to quickly identify the location of a caller to the emergency service. That caller may be in the basement of a remote building in the campus, or in any of hundreds if not thousands of office, laboratory, or workplace locations within the campus.

The difficulty in quickly locating the origin of a telephone call to an emergency service may be of life-or-death importance in some situations. If the caller cannot determine his location and communicate it verbally to the dispatcher, the response time of the emergency service will be severely impaired.

In many building complex or campus situations, there will be an on-site public safety answering point (PSAP) different from the municipality emergency service. Emergency calls originating within the campus may be routed by the PBX to the public safety answering point for immediate action. Such public safety answering points may have their own emergency numbers different from "911," but may also respond to "911." The emergency response personnel who answer the emergency calls from the PBX have the same problem of locating the source of the call as does the municipal 911 dispatcher. Many PBX installations, especially older installations, do not provide automatic number identification and location information.

Improved or alternative methods are desired for responding to emergency telephone calls.

SUMMARY OF THE INVENTION

A method according to a aspect of the invention is for identifying to a public safety answering point the location within a campus (building or building complex) from which a telephone call originates, where the campus uses a private business exchange to communicate with the public safety answering point, and the private business exchange includes a port at which the telephone numbers of each call source or origin and destination are produced. The port may be a serial port, and more particularly may be an RS232 serial port in a preferred embodiment of this aspect of the invention. The method according to this aspect also comprises the step of coupling at least the destination telephone number associated with each call from the port of the private business exchange to a first computerized database. The first computerized database relates at least one of the destination telephone numbers to an emergency category, and there may be more than one emergency category. In response to at least those of the calls associated with a destination telephone number relating to an emergency category, a second database, which may have software in common with the first database, is addressed with at least the call source telephone number. The second database is preloaded with information relating a plurality, preferably all, the source telephone numbers associated with the private business exchange to the location of the corresponding source telephone. The location of the source telephone is thereby determined. The location of at least the source telephone associated with a call to an emergency number is displayed to the public safety answering point.

A method according to another aspect of the invention identifies to a public safety answering point the location within a first campus and a second campus of a telephone from which an emergency telephone call originates, where the first campus uses a first private business exchange to communicate with the public safety answering point, and the second campus uses a second private business exchange to communicate with the public safety answering point. The first and second private business exchanges each include a port at which the origin and destination telephone numbers of each call handled by the associated one of the first and second private business exchanges, respectively, are produced. The method according to this aspect of the invention includes the step of coupling at least the destination telephone number associated with each call associated with the first private business exchange to a first computerized database. The first computerized database relates at least one of the destination telephone numbers to an emergency category. In response to at least those of the calls associated with the first private business exchange which are associated with a destination telephone number relating to the emergency category, a second computerized database (which may be run using software common to both first and second databases) is addressed using the source telephone number. The second computerized database is preloaded with information relating at least the source telephone numbers in the first campus to the corresponding location of the source telephone. Addressing the second computerized database with the source telephone number determines the location of the source telephone within the first campus. According to this aspect of the invention, at least the destination telephone numbers associated with each call associated with the second private business exchange are coupled to a third computerized database. The third computerized database relates at least one of the destination telephone numbers to an emergency category, which may be the same emergency category as that of the second database. In response to at least those of the calls associated with the second private business exchange which are associated with a destination telephone number relating to the emergency category, at least the source telephone number is transmitted to the second computerized database, and used to access the location of the source telephone within the second campus. The location of at least that telephone within the first and second campus which is the source of a call addressed to a telephone number associated with an emergency category is displayed to the public safety answering point.

In a particularly advantageous embodiment of this aspect of the invention, the transmission of the source telephone number which is transmitted to the second computerized database and used to locate the source telephone within the second campus is performed by way of a network connection, which may be a TCP/IP connection.

BRIEF DESCRIPTION OF THE DRAWING

FIG. 3a is a representation of a database relating destination telephone numbers to emergency/nonemergency status in the arrangement of FIG. 1, FIG. 3b is a representation of a database relating source telephone numbers to locations in either the arrangement of FIG. 1 or FIG. 2, and FIG. 3c is a representation of a database relating destination numbers to emergency/nonemergency status in the arrangement of FIG. 2;

DESCRIPTION OF THE INVENTION

Figure 1:
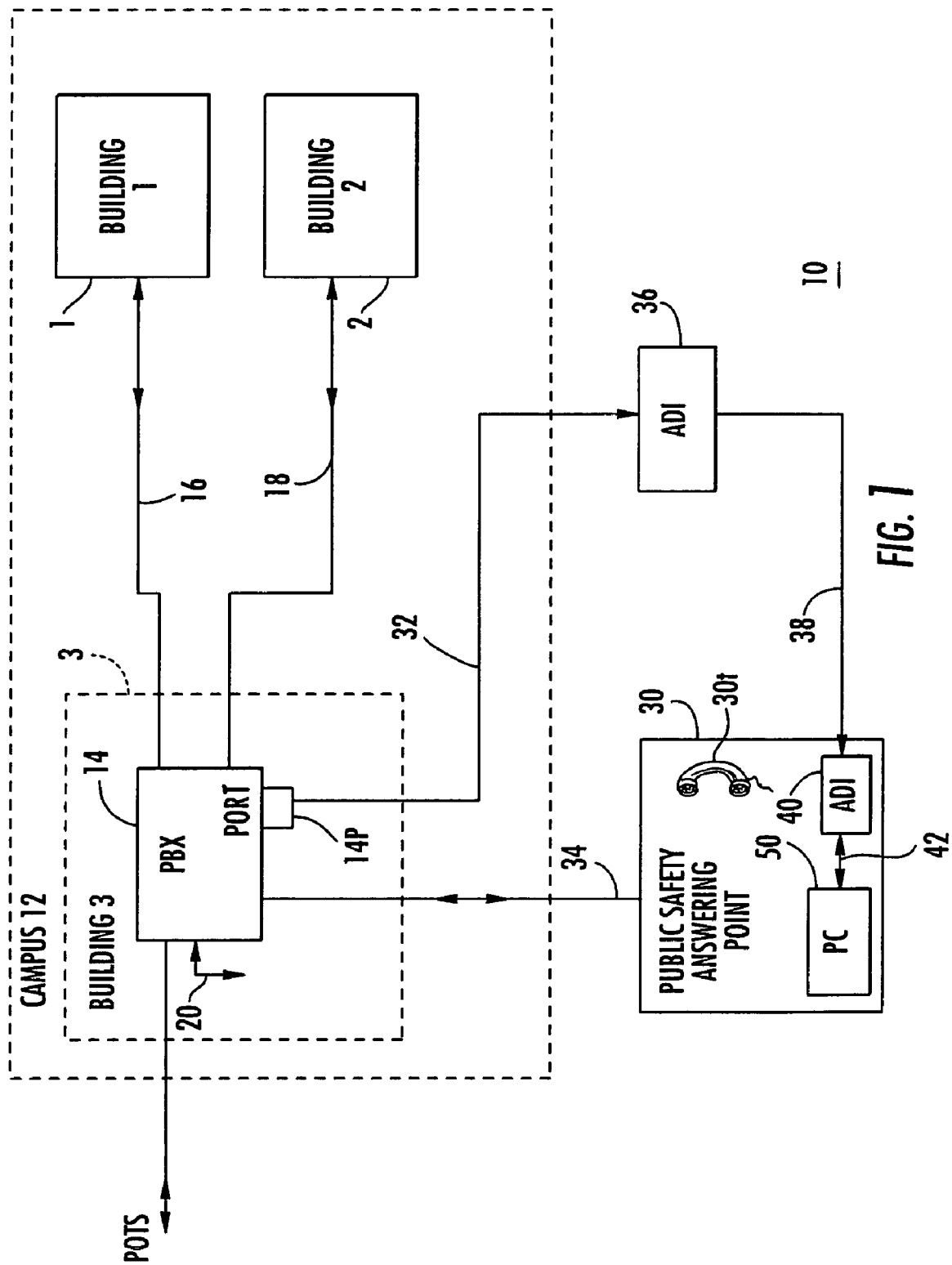
FIG. 1 is a simplified diagram, in block and schematic form, illustrating a campus according to an aspect of the invention, including a PBX, public safety answering point, and various interconnections.

In FIG. 1, an arrangement 10 according to an aspect of the invention includes a group of buildings designated building 1, building 2, and building 3, together constituting a campus 12. A campus may contain a single building, two, or more than three buildings. A private business telephone exchange (PBX) 14 is associated with the campus 12. As illustrated in FIG. 1, the PBX 14 is located within building 3 of campus 12, but it may be in any other building, or it may not even be on the campus at all. PBX 14 communicates by way of telephone lines, illustrated together as 16, with individual telephones or telephone extensions (not illustrated) located in building 1. PBX 14 also communicates, by way of telephone lines, illustrated together as 18, with individual telephones or telephone extensions (not illustrated) located in building 2. Similarly, PBX 14 communicates by way of telephone lines, designated together as 20, with telephones or telephone extensions (not illustrated) located in building 3. Private business exchange 14 provides intercommunication among the various telephones andor telephone extensions located in the buildings of campus 12, and also provides for interconnection between campus telephones and the outside world by way of the plain old telephone system (POTS).

Telephone calls between the outside world and campus 12 are routed by PBX 14 of FIG. 1. Telephone calls directed from a telephone within the campus 12 to a destination number which is also within the campus are routed by PBX 14.

Among the telephone numbers to which calls may be directed by PBX 14 of FIG. 1 is one (or more) telephones associated with a public safety answering point 30. For the purpose of transmitting to, and receiving telephone calls from, the public safety answering point 30, at least one telephone line, designated 34, links PBX 14 with at least one telephone, designated 30t, at public safety answering point 30. It should be noted that public safety answering point 30 is not the same as the municipal 911 dispatch center. However, PBX 14 does not identify to the outside world (that is, locations accessed by POTS) the source telephone number, thereby making location of an emergency call difficult to determine for a 911 dispatcher.

Certain private business exchanges, such as PBX 14 of FIG. 1, have a port, illustrated as a port 14p, at which information is available as to the source and destination telephone numbers of all calls placed from within the campus served by the PBX. The information available from this port is used, according to an aspect of the invention, to provide the public safety answering point with information which may be useful in the event of an emergency.

As illustrated in FIG. 1, the source and destination telephone numbers associated with each telephone call routed by PBX 14 and appearing at port 14p are routed by way of a serial line 32, such as an RS232 line, to an asynchronous data interface (ADI) 36, which converts the source and destination number information for transmission over an ordinary telephone line 38 to a receiver asynchronous data interface 40 associated with public safety answering point 30. Asynchronous data interface 40 converts the source and destination telephone number information back to serial form, and applies it by way of a serial path 42 to a computer apparatus, illustrated as a personal computer 50.

In operation of the system 10 of FIG. 1, telephone calls from telephones located throughout campus 12 are handled by PBX 14, with internally directed calls being routed within the campus, and with calls to and from the outside world being routed by PBX 14 and POTS. Occasionally, a telephone call may be directed from within campus 12 to an emergency number, such as "911" or some other internal number, which is designated "1234" for convenience, but which may be any number which PBX 14 is capable of handling.

The system of FIG. 1 may be operated in an "attended" mode or in an "unattended" mode. In an unattended mode, calls from within campus 12 directed to "911" may be routed by PBX 14 to POTS. This would at least provide for an emergency response, although subject to all the identification problems adverted to above. In the attended mode, calls to "911" from within campus 12 may be routed by PBX 14 to telephone 30t of public safety answering point 30 by way of telephone line 34. However, the attendant at public safety answering point 30 may need information about the location of the telephone which is the source of the call.

According to an aspect of the invention, the source and destination telephone number information available at port 14p of PBX 14 of FIG. 1 is used to generate information relating to the location within the campus of the source telephone number making an emergency call. For this purpose, at least first and second computerized data bases are prepared. The first computerized database relates the destination telephone numbers to one or more emergency situations, and the second computerized database relates each potential source telephone number within the campus to a location within the campus. While these databases are conceptually different, they may use common software for implementation.

FIGS. 3a and 3b illustrate the first database 301 and second database 302. The first database 301 is simply a preprogrammed table or index with destination telephone numbers as the index and the corresponding emergency or nonemergency status as the corresponding value. In database 301 of FIG. 3a, the destination telephone numbers are (for example) 1-0001 (building 1, first telephone), . . . , 1-1234 (first building, number 1234) which corresponds with one possible type of emergency, 1-1235 (first building, number 1235 which is a second possible type of emergency, namely "fire," 1-1236 (first building, number 1236, for medical emergency, 1-1237 (first building, number 1237) is a nonemergency number. Nonemergency numbers are routed to their destination nonemergency phones, while emergency numbers are routed to public safety answering point 30.

Database 302 of FIG. 3b is also an index or table, which relates source telephone numbers in a building or campus to their corresponding locations. As illustrated, source telephone number 0001 is located in portion A (which may be a numbered room or identifiable point) of building 1, number 0002 is located in portion B of building 1, number 0003 is located in portion C of building 2, and number 0004 is located in portion D of building 2.

Each time a telephone call is processed by PBX 14 of FIG. 1, the corresponding source and destination telephone numbers are coupled from port 14p of PBX 14, and flow by way of the path including ADI 36, telephone line 38, and ADI 40 to personal computer (PC) 50. Personal computer 50 runs the software relating to the first and second databases. When a destination telephone number arrives at PC 50 of FIG. 1, it is used to address the first database 301 of FIG. 3a, which relates each destination to an emergency or nonemergency situation. Most telephone calls in the campus will relate to nonemergency situations, and so are irrelevant to the public safety answering point 30. The first database 301 of FIG. 3a, under the control of PC 50, conceptually segregates the emergency calls from the nonemergency calls, for example by producing a flag for an emergency call, and no flag for the nonemergency call. Different types of emergencies may also be identified by different destination telephone numbers, as for example "1235" for fire, "1236" for medical, and so forth. The first database 301 may make such distinctions, but in all cases must raise a flag of some sort to distinguish emergency calls from nonemergency calls. All the internal (originating from within the campus) emergency numbers are routed by PBX 14 to corresponding telephone lines running to public safety answering point 30.

When a nonemergency call is made within campus 12, it is routed by PBX 14 to the appropriate destination telephone, whether within the campus or to the outside world by way of POTS. The destination number is routed from PBX 14 port 14p to the first database 301 in PC 50, where it is identified as a nonemergency number, and no flag is raised. In general, a nonemergency telephone call will not be made to the public safety answering point, so no action need be taken.

When an emergency call is made from within campus 12 of FIG. 1, the call will ordinarily (except in the nonattended condition) be routed by PBX 14 to the public safety answering point 30, and a telephone will ring at that location. If the call relates in fact to an emergency, the attendant needs the additional information. According to an aspect of the invention, the source telephone number arriving at PC 50 of FIG. 1 is applied as an address to the second database 302 of FIG. 3b, to thereby access information stored in the second database 302 relating to the location of each telephone in the campus 12 of FIG. 1. In response to the determination by addressing of the first database (301) that the call is an emergency call (that is, the raising of the "emergency" flag), the second database (302) is read, and the information is presented to the attendant at the public safety answering point concurrently with the call itself. Assuming reasonable operating speed for the various pieces of equipment, the information as to the location of the caller making a call to an emergency number will become available essentially concurrently with the ringing of the emergency telephone, but such speed is not a requirement of the invention.

While the source telephone location within campus 12 of FIG. 1 could be determined by addressing the second database (302 of FIG. 3b) for each call, emergency or nonemergency, and the information could be passed to the attendant only if the "emergency" flag is raised, it may be computationally more efficient to address the second database (302) only if the "emergency" flag is raised. Either method should be satisfactory.

Figure 2:
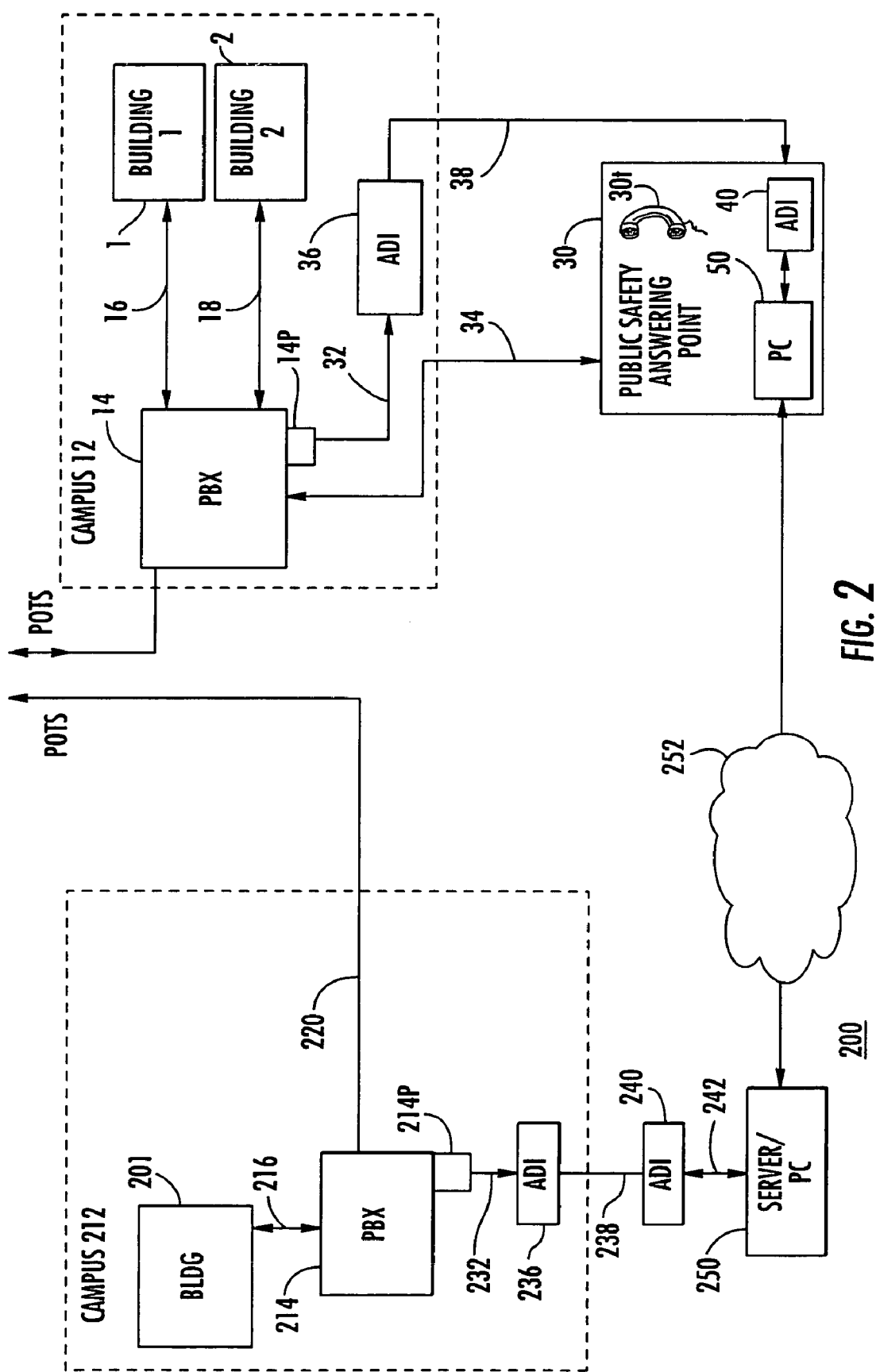
FIG. 2 is a simplified diagram similar to that of FIG. 1, but showing two separate campuses served by two separate PBXs, a public safety answering point, and various interconnections.

FIG. 2 illustrates another embodiment of the invention. In FIG. 2, a campus 12 similar to that of FIG. 1 is illustrated, together with a public safety answering point, also similar to that of FIG. 1. Corresponding elements of FIGS. 1 and 2 are designated by like reference alphanumerics. In FIG. 2, a second campus 212 includes a building 201, and possibly other buildings (not illustrated). A second PBX 214 is associated with campus 212 (but is not necessarily located on campus) and communicates with the telephone extensions (not illustrated) of building 201 by way of telephone lines illustrated as 216. PBX 214 also communicates with the outside world by way of POTS and path 220. As with PBX 14, PBX 214 has a port, designated 214p, at which information is produced relating to the source and destination telephone numbers handled by the PBX.

The information relating to the source and destination telephone numbers handled by PBX 214 of FIG. 2 is coupled from port 214p to an asynchronous data interface (ADI) 236 by way of an RS232 line 232. ADI 236 converts the information into a format which can be transmitted over a telephone line, and sends the information by way of a telephone line or path 238 to a further ADI 240. ADI 240 converts the information back to a serial data format and applies it to a computer arrangement, which may be a server or personal computer (PC) 250.

Within computing apparatus 250 of FIG. 2, the destination telephone number arriving from ADI 240 is applied to a third database which is preprogrammed with a status for each destination telephone number. Third database 303 is illustrated in FIG. 3c, and relates destination telephone numbers to emergency conditions. As illustrated in FIG. 3c, destination phone numbers 2-0001 and 2-0002 are nonemergency numbers. Since campuses 12 and 212 are served by the same public safety answering point 30, one may expect that the destination telephone numbers, such as 1-1235 and 1-1236 which identify or address public safety answering point 30 will also be related to emergency conditions or status. As with the destination number data base 301 (FIG. 3*a*) of PC 50 of FIG. 1, the destination number data base (303 of FIG. 3C) of computing apparatus 250 of FIG. 2 relates a nonemergency status to calls from within its campus 212 which are directed toward ordinary nonemergency numbers. Also, the destination number database of computing apparatus 250 relates one or more destination telephone numbers to one or more emergency conditions or statuses. Such emergency destination telephone numbers should be those which are routed by PBX 214 ultimately to public safety answering point 30.

At least those source telephone numbers arising from campus 212 of FIG. 2 which are associated with an emergency status are placed in TCP/IP form and transmitted over a network path, illustrated as a cloud 252, to PC 50 of the public safety answering point. PC 50 applies the source telephone number which it receives from network 252 to its source telephone location database 302. Referring to database 302 of FIG. 3*b*, one may note that it includes as part of the telephone numbers (2-0001) from campus 212. PC 50 of FIG. 1 addresses its database 302 with the source telephone number which was associated with an emergency condition by computing apparatus 250 of FIG. 2, and produces physical location information about the location in campus 212 of the source telephone transmitted from computing apparatus 250.

Ideally, computing apparatus 250 would also transmit to PC 50, together with the source telephone number, the type of emergency with which the call has been associated. As with location information relating to campus 12, location information relating to campus 212 is made available by PC 50 to the attendant at the public safety answering point 30 of FIG. 2, thereby providing all the information advantages with respect to a second campus to the public safety answering point associated with the two campuses. Of course, more than one additional campus can be provided with the benefits of this aspect of the invention, by simply providing a computing apparatus corresponding to 250 of FIG. 2 for each additional campus and associated PBX.

Figure 4A:
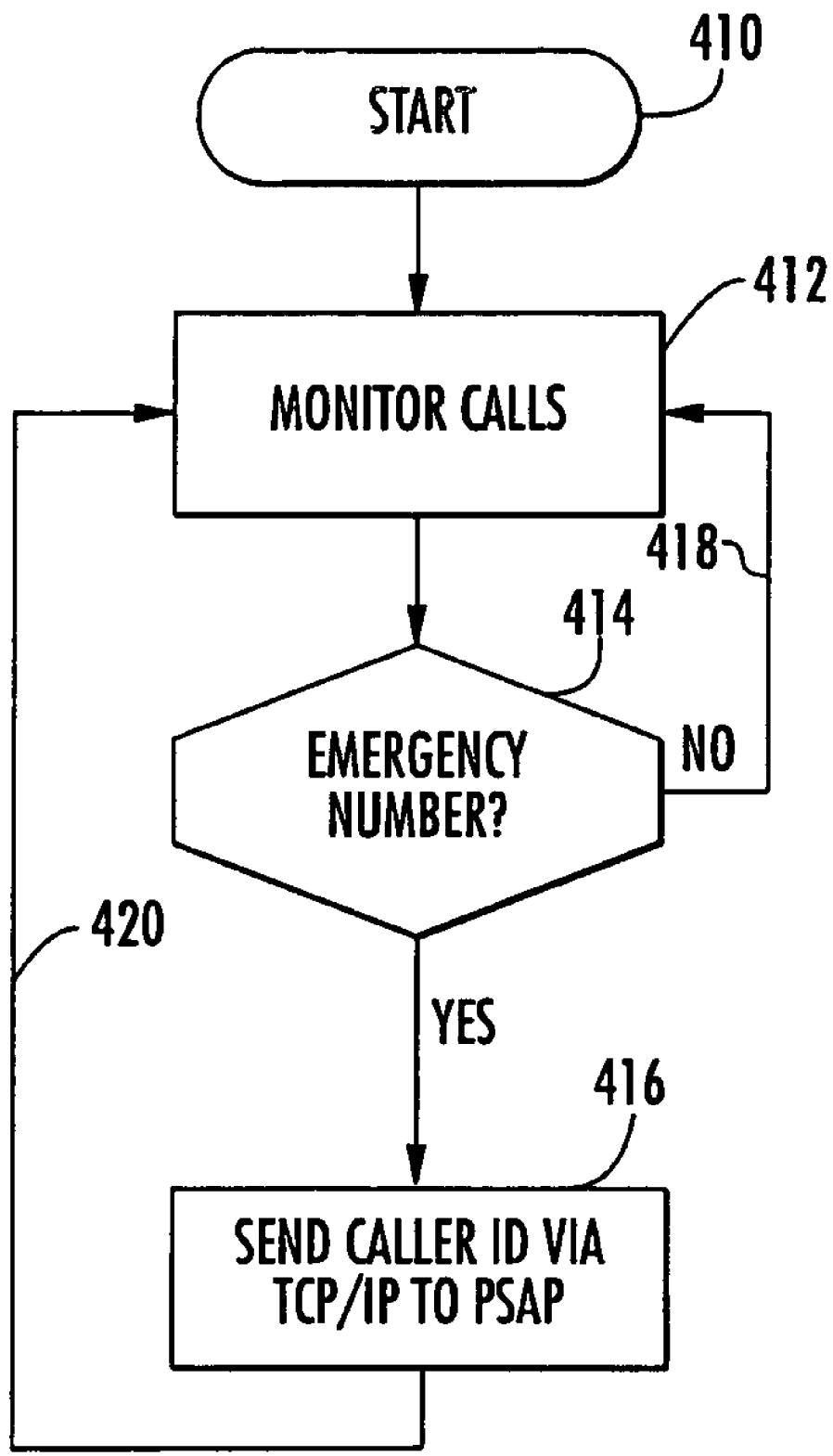
FIGS. 4a and 4b together represent a simplified logic flow chart or diagram, illustrating some aspects of the software associated with the campus of FIG. 1.

FIG. 4*a* represents logic which may be located anywhere in the system of FIG. 2, as for example in server/PC 250. In FIG. 4*a*, the logic begins at a START block 410, and proceeds to a block 412, representing the monitoring of the destination numbers of calls. For each call, the logic flows from block 412 to a decision block 414, which compares the destination number to a database including at least one destination number which is deemed or assigned to be an emergency number. If the destination number of the call is not one of the emergency numbers, the logic returns to block 412 by the NO output and a path 418 to continue monitoring calls. If the destination number is identified as an emergency number, the logic flows by way of the YES output of decision block 414 to a block 416, which represents the sending of at least the caller ID to the public safety answering point. From block 416, the logic returns to block 412 by way of path 420.

Figure 4B:
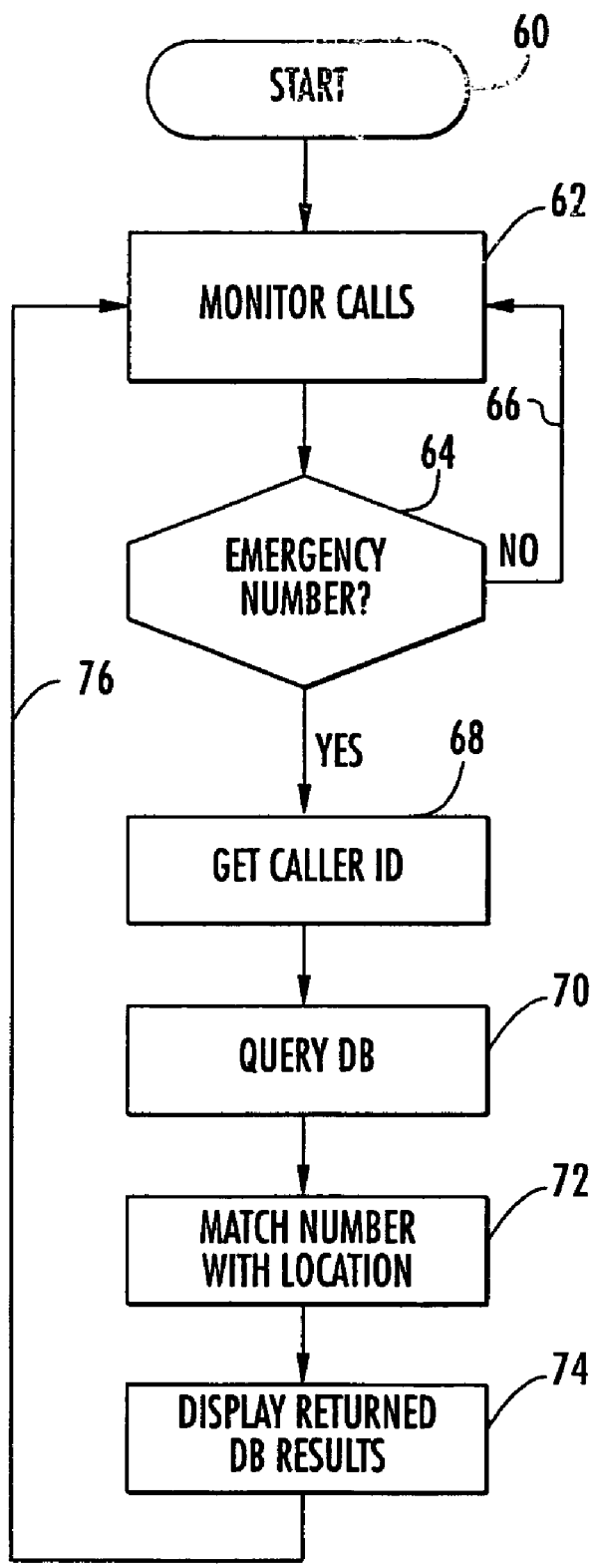

The logic of FIG. 4*b* is associated with the processing which is associated with the public safety answering point. In FIG. 4*b*, the logic begins at a START block 60, and proceeds to a block 62, which represents the monitoring of the destination number of each telephone call. For each call, the logic flows to a decision block 64, where the telephone number is compared with a database relating destination numbers to emergency/nonemergency status. If decision block 64 deems the destination number to be nonemergency, the logic returns to block 62 by way of logic path 66. If the destination number is deemed to be an emergency number, the logic leaves block 64 and proceeds to a block 68, which represents the obtaining of the caller ID, if not already available. Blocks 70 and 72 together represent the querying or addressing of a database, such as database 302 of FIG. 3*b*, for the physical location of the calling telephone. From block 72, the logic flows to a block 74, which represents the display to the attendant at the public safety answering point of the location of the telephone from which the emergency call was (or is being) made. From block 74, the logic returns to block 62 by way of a logic path 76.

The invention in its simplest form contemplates that the location of the telephone from which a call is made to an emergency number is displayed in some way to the PSAP attendant. One simple way to provide this information is to provide a building or complex address, including building number or identifier if appropriate, floor, and room number or address. Unless the attendant has a good knowledge of the campus, he may need the assistance of a map to be able to efficiently allocate emergency response resources. Such maps of buildings and building complexes, and campuses are well known, with the notation "You Are Here" being one of the common notations on such maps posted throughout the campus.

In order to assist as much as possible the attendant at the public safety answering point, to thereby tend to reduce response time, it is desirable to provide a computerized map of the campus, with an indication, as for example by means of a red "X," showing on that computerized map the location from which the emergency call was (is being) made. Such a computerized map is ideally a three-dimensional map which can be rotated and zoomed under control of the attendant. The methods by which such maps are created and displayed are known to those skilled in the art, and no description is deemed necessary.

Other embodiments of the invention will be apparent to those skilled in the art. For example, the physical locations of the asynchronous data interfaces (ADIs) 36 and 40 are ideally near their respective serial sources and sinks, respectively, so that the serial data transmission path length is short; thus, ADI 36 would be physically near PBX port 14*p* and ADI 40 would be physically near PC 50. However, their physical locations are not important to the invention. Similarly, the physical locations of the campus relative to the public safety answering point is irrelevant to the invention. The invention is not dependent upon the way in which information from the PBX serial port reaches the databases, only that the information, in useful form, is used to address the databases, and that the resulting location information is provided in some useful form to the PSAP attendant. While decision blocks of some of the logic elements are described as determining emergency/nonemergency status, the determination may implicit rather than explicit, as simply the setting of a flag for one determination or the other, with the other determination being implied by the other state of the flag.

A method according to a aspect of the invention is for identifying to a public safety answering point (30) the location within a campus (12) from which a telephone call originates, where the campus (12) uses a private business exchange (14) to communicate with the public safety answering point (30), and the private business exchange (14)

includes a port (14*t*) at which the telephone numbers of each call source or origin and destination are produced. A campus may include a single building (201) or a plurality of buildings (1, 2, . . . ) constituting a building complex or campus. The port (14*t*) may be a serial port, and more particularly may be an RS232 serial port in a preferred embodiment of this aspect of the invention. The method according to this aspect of the invention also comprises the step of coupling at least the destination telephone number associated with each call from the port (14*t*) of the private business exchange (14) to a first computerized database (301). The first computerized database (301) relates at least one of the destination telephone numbers to an emergency category, and there may be more than one emergency category. In response to at least those of the calls associated with a destination telephone number relating to an emergency category, a second computerized database (302), which may have software in common with the first computerized database (301), is addressed with at least the call source telephone number. The second computerized database (302) is preloaded with information relating a plurality, and preferably all, the source telephone numbers associated with the private business exchange (14) to the corresponding location of the corresponding source telephone. The location of the source telephone is thereby determined. The location of at least the source telephone associated with a call to an emergency number is displayed to the public safety answering point (30).

A method according to another aspect of the invention identifies to a public safety answering point (30) the location within a first campus (12) and a second campus (212) of a telephone from which an emergency telephone call originates, where the first campus (12) uses a first private business exchange (14) to communicate with the public safety answering point (30), and the second campus (212) uses a second private business exchange (214) to communicate with the public safety answering point (30). The first and second private business exchanges (14, 214) each include a port (14*t*, 214*t*) at which the origin and destination telephone numbers of each call handled by the associated one of the first (14) and second (214) private business exchanges (14, 214), respectively, are produced. The method according to this aspect of the invention includes the step of coupling at least the destination telephone number associated with each call associated with the first private business exchange (14) to a first computerized database (301). The first computerized database (301) relates at least one of the destination telephone numbers to an emergency category. In response to at least those of the calls associated with the first private business exchange (14) which are associated with a destination telephone number relating to the emergency category, a second computerized database (302), which may be run using software common to both first (301) and second (302) databases, is addressed using the source telephone number. The second computerized database (302) is preloaded with information relating at least the source telephone numbers in the first campus (12) to the corresponding location of the source telephone. Addressing the second computerized database (302) with the source telephone number determines the location of the source telephone within the first campus (12). According to this aspect of the invention, at least the destination telephone numbers associated with each call associated with the second private business exchange (214) are coupled to a third computerized database (303). The third computerized database (303) relates at least one of the destination telephone numbers arising from the second campus (212) to an emergency category, which may be the same emergency category as that of the second database. In response to at least those of the calls associated with the second private business exchange (214) which are associated with a destination telephone number relating to the (or an) emergency category, at least the source telephone number is transmitted to the second computerized database (302), and used to access the location of the source telephone within the second campus (212). The location of at least that telephone within the first (12) and second (212) campus which is the source of a call addressed to a telephone number associated with an emergency category is displayed to the public safety answering point (30).

In a particularly advantageous embodiment of this aspect of the invention, the transmission of the source telephone number which is transmitted to the second computerized database (302) and used to locate the source telephone within the second campus (212) is performed by way of a network connection (252), which may be a TCP/IP connection.

What is claimed is:

1. A method for identifying to a public safety answering point the location within a campus from which a telephone call originates, where the campus uses a private business exchange to communicate with the public safety answering point, which private business exchange includes a port at which the origin and destination telephone numbers of each call are produced, said method comprising the steps of:

coupling at least said destination telephone numbers associated with each said call from said port of said private business exchange to a first computerized database, said first computerized database relating at least one of said destination telephone numbers to a particular emergency category;

in response to at least those of said calls associated with a destination telephone number relating to said emergency category, addressing with said source telephone numbers a second database preloaded with information relating the source telephone numbers to the location of the source telephone, to thereby determine the location of said source telephone; and displaying to said public safety answering point at least the locations of those telephones which are the sources of calls addressed to telephone numbers associated with said emergency category.

2. A method according to claim 1, wherein said port connection of said private business exchange is a serial port.

3. A method according to claim 2, wherein said serial port connection of said private business exchange is an RS232 port.

4. A method according to claim 1, wherein said first and second databases have software in common.

5. A method according to claim 1, wherein said step of displaying the locations includes the step of displaying only text.

6. A method for identifying to a public safety answering point the location within a first campus and a second campus from which a telephone call originates, where the first campus uses a first private business exchange to communicate with the public safety answering point, and the second campus uses a second private business exchange to communicate with said public safety answering point, said first and second private business exchanges each include a port at which the source and destination telephone numbers of each call handled by the associated one of said first and second private business exchanges, respectively, are produced, said method comprising the steps of:

coupling at least said destination telephone numbers associated with each said call associated with said first private business exchange to a first computerized database, said first computerized database relating at least one of said destination telephone numbers to a particular emergency category;

in response to at least those of said calls associated with said first private business exchange which are associated with a destination telephone number relating to said particular emergency category, addressing with the corresponding source telephone number a second computerized database preloaded with information relating the source telephone numbers of said first and second campus to the corresponding locations of said source telephones in said first and second campus, to thereby determine the location of said source telephone within said first campus;

coupling at least said destination telephone numbers associated with each said call associated with said second private business exchange to a third computerized database, said third computerized database relating at least one of said destination telephone numbers to an emergency category;

in response to at least those of said calls associated with said second private business exchange which are associated with a destination telephone number relating to said emergency category, transmitting at least said source telephone number to said first computerized database; and displaying to said public safety answering point at least the locations within said first and second campus of those telephones which are the sources of calls addressed to telephone numbers associated with an emergency category.

7. A method according to claim 6, wherein said port of one of said first and second private business exchanges is a serial port.

8. A method according to claim 7, wherein said serial port connection of said one of said first and second private business exchanges is an RS232 port.

9. A method according to claim 6, wherein said first and second databases have software in common.

10. A method according to claim 6, wherein said emergency category of said third database is the same as said emergency category of said first database.

11. A method according to claim 6, wherein said step of transmitting at least said source telephone number to said first computerized database includes the step of transmission over a network connection.

12. A method according to claim 11, wherein said step of transmission over a network connection includes the step of conversion to TCP/IP format.

13. A method according to claim 6, wherein said step of displaying to said public safety answering point at least the locations within said first and second campus of those telephones which are the sources of calls addressed to telephone numbers associated with an emergency category includes the step of displaying only a text address.

* * * * *